US011461270B2

(12) United States Patent
Willnauer (10) Patent No.: US 11,461,270 B2
(45) Date of Patent: Oct. 4, 2022

(54) SHARD SPLITTING

(71) Applicant: Elasticsearch B.V., Mountain View, CA (US)

(72) Inventor: Simon Daniel Willnauer, Berlin (DE)

(73) Assignee: Elasticsearch B.V., Amsterdam (NL)

( * ) Notice: Subject to any disclaimer, the term of this patent is extended or adjusted under 35 U.S.C. 154(b) by 454 days.

(21) Appl. No.: 16/176,956

(22) Filed: Oct. 31, 2018

(65) Prior Publication Data

US 2020/0133550 A1    Apr. 30, 2020

(51) Int. Cl.
*G06F 16/13* (2019.01)
*G06F 16/182* (2019.01)
*G06F 3/06* (2006.01)

(52) U.S. Cl.
CPC ........ *G06F 16/137* (2019.01); *G06F 16/1827* (2019.01); *G06F 3/065* (2013.01); *G06F 3/067* (2013.01); *G06F 3/0619* (2013.01)

(58) Field of Classification Search
CPC ........................... G06F 16/1827; G06F 16/137
See application file for complete search history.

(56) References Cited

U.S. PATENT DOCUMENTS

| | | | |
|---|---|---|---|
| 6,519,597 B1 * | 2/2003 | Cheng .................. | G06F 16/284 |
| 7,945,533 B2 * | 5/2011 | Krishnaprasad ...... | G06F 16/951 |
| | | | 707/637 |
| 8,352,519 B2 | 1/2013 | Nath | |
| 8,615,794 B1 | 12/2013 | Tomilson et al. | |
| 8,898,261 B1 | 11/2014 | Patsenker et al. | |
| 8,930,332 B2 * | 1/2015 | Burstein ............. | G06F 16/2272 |
| | | | 707/696 |
| 9,015,301 B2 | 4/2015 | Redlich et al. | |

(Continued)

FOREIGN PATENT DOCUMENTS

| CN | 106528797 A | 3/2017 |
|---|---|---|
| CN | 106934062 A | 7/2017 |

(Continued)

OTHER PUBLICATIONS

"International Search Report" and "Written Opinion of the International Searching Authority," Patent Cooperation Treaty Application No. PCT/US2019/063437, dated Feb. 7, 2020, 8 pages.

(Continued)

*Primary Examiner* — Miranda Le
(74) *Attorney, Agent, or Firm* — Quinn IP Law (57) ABSTRACT

Methods and systems for shard splitting are provided. Exemplary methods include: marking a source index as read only, the source index comprising a source shard, the source shard comprising a source reference; creating a target index, the target index comprising target shards, each target shard of the target shards comprising a target reference of target references; copying the source reference, the copying producing the target references; hashing identifiers in the source reference, each identifier being associated with a document of a plurality of documents of the source shard, the hashing assigning each document of the plurality of documents to a target shard of the target shards, the plurality of documents being stored in a file associated with the source reference; hard linking the file into the target references; marking the target index as read-write; and deleting the source index.

18 Claims, 8 Drawing Sheets

(56) References Cited

U.S. PATENT DOCUMENTS

| | | |
|---|---|---|
| 9,734,180 B1 | 8/2017 | Graham et al. |
| 10,541,983 B1 | 1/2020 | Khashei Varnamkhasti et al. |
| 10,891,165 B2 | 1/2021 | Willnauer |
| 10,997,204 B2 | 5/2021 | Leskes |
| 11,182,093 B2 | 11/2021 | Leskes |
| 11,188,531 B2 | 11/2021 | Leau |
| 2005/0004892 A1 | 1/2005 | Brundage et al. |
| 2005/0114397 A1 | 5/2005 | Doshi et al. |
| 2006/0075079 A1 | 4/2006 | Powers et al. |
| 2009/0276215 A1 | 11/2009 | Hager |
| 2010/0174677 A1 | 7/2010 | Zahavi |
| 2010/0179940 A1 | 7/2010 | Giider |
| 2011/0134764 A1 | 6/2011 | Venkatapadmanaabhan |
| 2011/0282839 A1* | 11/2011 | Paksoy ............... G06F 11/1458 707/640 |
| 2012/0233118 A1 | 9/2012 | Holt et al. |
| 2012/0233299 A1 | 9/2012 | Attanasio et al. |
| 2013/0086039 A1 | 4/2013 | Salch et al. |
| 2013/0297469 A1 | 11/2013 | Spittle et al. |
| 2014/0012814 A1* | 1/2014 | Bercovici ........... G06F 16/2379 707/636 |
| 2014/0157224 A1 | 6/2014 | Capuozzo et al. |
| 2014/0279871 A1 | 9/2014 | Ochoa et al. |
| 2014/0330785 A1* | 11/2014 | Isherwood .......... G06F 11/1446 707/640 |
| 2015/0280999 A1 | 10/2015 | Chart et al. |
| 2015/0293955 A1 | 10/2015 | Dickey |
| 2015/0379083 A1 | 12/2015 | Lang et al. |
| 2016/0085839 A1* | 3/2016 | D'Halluin ............... G06F 16/21 707/747 |
| 2016/0127517 A1 | 5/2016 | Shcherbakov |
| 2016/0191509 A1* | 6/2016 | Bestler ................ G06F 12/1408 713/163 |
| 2016/0203168 A1* | 7/2016 | Gangadharappa ...... G06F 16/27 707/696 |
| 2016/0203174 A1* | 7/2016 | Shahane ............. G06F 16/2228 707/803 |
| 2016/0224600 A1 | 8/2016 | Munk |
| 2016/0292171 A1* | 10/2016 | Bhagat ................ G06F 16/2272 |
| 2017/0024453 A1 | 1/2017 | Raja et al. |
| 2017/0078167 A1 | 3/2017 | Bansal |
| 2017/0093640 A1 | 3/2017 | Subramanian et al. |
| 2017/0124151 A1 | 5/2017 | Ji et al. |
| 2017/0193041 A1* | 7/2017 | Fuchs ................. G06F 16/2453 |
| 2017/0371926 A1 | 12/2017 | Shiran et al. |
| 2018/0189328 A1* | 7/2018 | Frazier ..................... G06F 16/25 |
| 2018/0268000 A1 | 9/2018 | McManus et al. |
| 2019/0026336 A1 | 1/2019 | Tian |
| 2019/0124105 A1 | 4/2019 | Chauhan |
| 2019/0266271 A1 | 8/2019 | Leau |
| 2020/0050612 A1 | 2/2020 | Bhattacharjee et al. |
| 2020/0084213 A1 | 3/2020 | Taropa |
| 2020/0176098 A1 | 6/2020 | Lucas et al. |
| 2020/0201879 A1 | 6/2020 | Leskes |
| 2020/0233692 A1 | 7/2020 | Kandula |
| 2020/0326986 A1 | 10/2020 | Willnauer |
| 2020/0328936 A1 | 10/2020 | Pérez-Aradros Herce et al. |
| 2020/0348878 A1 | 11/2020 | Leskes |
| 2021/0124620 A1 | 4/2021 | Willnauer |
| 2021/0126977 A1 | 4/2021 | Ruflin et al. |
| 2021/0015263 A1 | 5/2021 | Ruflin et al. |
| 2021/0240731 A1 | 8/2021 | Leskes |
| 2022/0035555 A1 | 2/2022 | Leskes |
| 2022/0050844 A1 | 2/2022 | Leau |
| 2022/0075646 A1 | 3/2022 | Landau et al. |

FOREIGN PATENT DOCUMENTS

| | | |
|---|---|---|
| EP | 3899710 A1 | 10/2021 |
| GB | 2592130 A | 8/2021 |
| WO | WO2020131330 A1 | 6/2020 |

OTHER PUBLICATIONS

Tedor, Jason, "Introduce Cross-Cluster Replication"; GitHub [online], Sep. 5, 2017 [retrieved Jan. 24, 2020], retrieved from the Internet: <https://github.com/elastic/elasticsearch/issues/30086>, 9 pages.

Willnauer, Simon Daniel, "Frozen Indices," U.S. Appl. No. 16/383,562, filed Apr. 12, 2019, Specification, Claims, Abstract, and Drawings, 50 pages.

Leskes, Boaz, "Cross Cluster Replication," U.S. Appl. No. 16/229,847, filed Dec. 21, 2018, Specification, Claims, Abstract, and Drawings, 53 pages.

Makwarth et al., "Distributed Tracing for Application Performance Monitoring," U.S. Appl. No. 16/381,997, filed Apr. 11, 2019, Specification, Claims, Abstract, and Drawings, 43 pages.

Kline, K., "SQL in a Nutshell", O'Reilly Media, Inc., Dec. 2000 [Retrieved on Jul. 28, 2020], Retrieved from the Internet: <https://learning.oreilly.com/library/view/sql-in-a/1565927443/>, 10 pages.

Bradford, Ronald, "SQL, ANSI Standards, PostgreSQL and MySQL", Retrieved from the Internet: <URL http://ronaldbradford.com/blog/sql-ansi-standards-postgresql-and-mysql-2015-03-26/, Mar. 26, 2015 [retrieved on Jun. 4, 2021], 33 pages.

"Can i use elasticsearch-sql to convert sql to DSL?", GitHub, Retrieved from the Internet: <URL https://github.com/NLPchina/elasticsearch-sql/issues/156>, Feb. 2016 [retrieved on Jul. 29, 2020], 4 pages.

Andhavarapu, Abhishek, "Beginners guide to querying Elasticsearch (Scoring vs Sorting)", Retrieved from the Internet: <URL https://abhishek376.wordpress.com/2017/07/06/begginers-guide-to-querying-elasticsearch/, Jul. 6, 2017 [retrieved on Jun. 4, 2021], 10 pages.

"Extended European Search Report", European Patent Application No. 21165715.0, dated Dec. 10, 2020, 7 pages.

"Office Action", British Patent Application No. 2104443.3, dated Aug. 16, 2021, 9 pages.

"Office Action", British Patent Application No. GB2105205.5, dated Oct. 4, 2021, 11 pages.

"Extended European Search Report", European Patent Application No. 21167941.0, dated Sep. 6, 2021, 10 pages.

* cited by examiner

Figure 1:
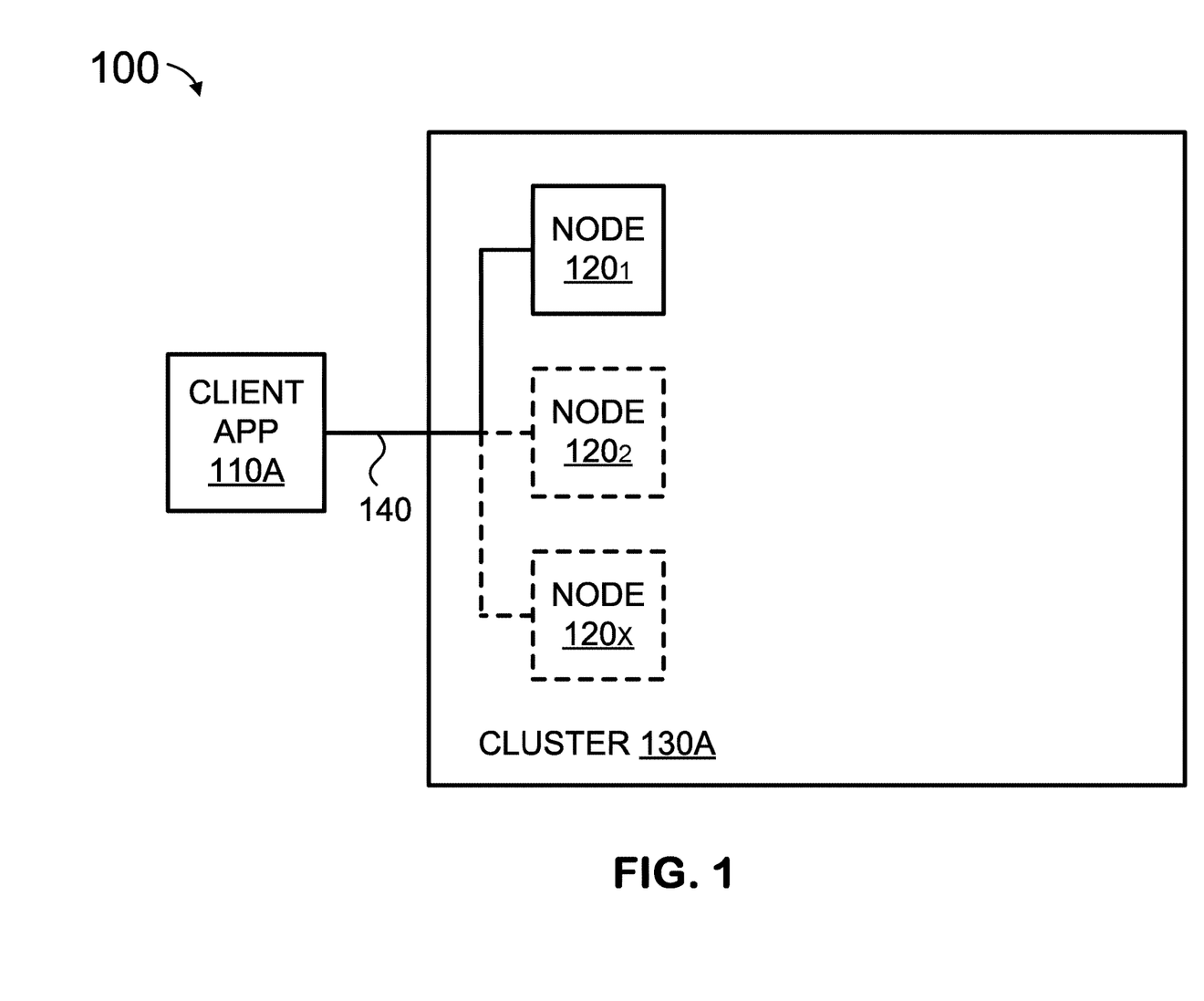
FIG. 1 is a simplified block diagram of a system having a distributed application structure, according to some embodiments.

FIG. 8 ial application structure, according to some embodiments. System 100 includes client application 110A, one or more nodes 120₁-120ₓ, and connections 140. Collectively, one or more nodes 120₁-120ₓ form cluster 130A. When only one node (e.g., node 120₁) is running, then cluster 130A is just one node.

SHARD SPLITTING

FIELD OF THE INVENTION

The present technology pertains to organized collections of information and more specifically to optimizing organized collections of information.

BACKGROUND ART

The approaches described in this section could be pursued but are not necessarily approaches that have previously been conceived or pursued. Therefore, unless otherwise indicated, it should not be assumed that any of the approaches described in this section qualify as prior art merely by virtue of their inclusion in this section.

Data communications networks can be used for a distributed application structure that divides tasks between the providers of a resource or service, called servers, and service requesters, called clients. A server host runs one or more server programs, which share their resources with clients. A client does not necessarily share any of its resources, but requests a server's content or service function. Clients initiate communication sessions with servers which await incoming requests.

SUMMARY OF THE INVENTION

This summary is provided to introduce a selection of concepts in a simplified form that are further described in the Detailed Description below. This summary is not intended to identify key features or essential features of the claimed subject matter, nor is it intended to be used as an aid in determining the scope of the claimed subject matter.

The present disclosure is related to various systems and methods for shard splitting. Specifically, a method for shard splitting may comprise: marking a source index as read only, the source index comprising a source shard, the source shard comprising a source reference; creating a target index, the target index comprising target shards, each target shard of the target shards comprising a target reference of target references; copying the source reference, the copying producing the target references; hashing identifiers in the source reference, each identifier being associated with a document of a plurality of documents of the source shard, the hashing assigning each document of the plurality of documents to a target shard of the target shards, the plurality of documents being stored in a file associated with the source reference; deleting at least some documents of the plurality of documents in the target references, the at least some documents belonging in a different target shard of the target shards; hard linking the file into the target references; marking the target index as read-write, such that the target index is used in place of the source index. Some embodiments may further include: deleting the source index.

BRIEF DESCRIPTION OF THE DRAWINGS

Embodiments are illustrated by way of example, and not by limitation, in the figures of the accompanying drawings, in which like references indicate similar elements and in which.

DETAILED DESCRIPTION

While this technology is susceptible of embodiment in many different forms, there is shown in the drawings and will herein be described in detail several specific embodiments with the understanding that the present disclosure is to be considered as an exemplification of the principles of the technology and is not intended to limit the technology to the embodiments illustrated. The terminology used herein is for the purpose of describing particular embodiments only and is not intended to be limiting of the technology. As used herein, the singular forms "a," "an," and "the" are intended to include the plural forms as well, unless the context clearly indicates otherwise. It will be further understood that the terms "comprises," "comprising," "includes," and/or "including," when used in this specification, specify the presence of stated features, integers, steps, operations, elements, and/or components, but do not preclude the presence or addition of one or more other features, integers, steps, operations, elements, components, and/or groups thereof. It will be understood that like or analogous elements and/or components, referred to herein, may be identified throughout the drawings with like reference characters. It will be further understood that several of the figures are merely schematic representations of the present technology. As such, some of the components may have been distorted from their actual scale for pictorial clarity.

FIG. 1 shows system 100 having a distributed application structure, according to some embodiments. System 100 includes client application 110A, one or more nodes 120₁-120ₓ, and connections 140. Collectively, one or more nodes 120₁-120ₓ form cluster 130A. When only one node (e.g., node 120₁) is running, then cluster 130A is just one node.

In various embodiments, a cluster (e.g., cluster 130A) is a collection of one or more nodes (servers) (e.g., one or more nodes 120₁-120ₓ) that together store data and provides federated indexing and search capabilities across all nodes. A cluster can be identified by a unique name, such that a node can be part of a cluster when the node is set up to join the cluster by its name. A cluster may have only one node in it.

In some embodiments, a node (e.g., one or more nodes 120₁-120ₓ) is a single server that is part of a cluster (e.g., cluster 130A), stores data, and participates in the cluster's indexing and search capabilities. A node can be identified by a name which by default is a random Universally Unique IDentifier (UUID) that is assigned to the node at startup. Any number of nodes can be in a single cluster.

An index (not depicted in FIG. 1) is a collection of documents that have somewhat similar characteristics, according to various embodiments. For example, you can have an index for customer data, another index for a product catalog, and yet another index for order data. An index is identified by a name and this name is used to refer to the index when performing indexing, search, update, and delete operations against the documents in it. A document (not depicted in FIG. 1) is a basic unit of information that can be indexed, according to some embodiments. For example, you can have a document for a single customer, another document for a single product, and yet another for a single order. An index can potentially store a large amount of data that can exceed the hardware limits of a single node. For example, a single index of a billion documents taking up 1 TB of disk space may not fit on the disk of a single node or may be too slow to serve search requests from a single node alone. An index can be subdivided into multiple pieces called shards. Each shard can be a fully-functional and independent "index" that can be hosted on any node (e.g., one or more nodes $120_1$-$120_X$) in the cluster.

In some embodiments, one or more application programming interfaces (API) can be used to communicate with a cluster (e.g., cluster 130A). An API can include a set of subroutine definitions and protocols. For example, a node client and/or a transport client can be used be used to communicate with nodes (e.g., one or more nodes $120_1$-$120_X$) in a cluster. A node client joins a local cluster as a non-data node, which doesn't hold any data itself, but knows what data lives on which node in the cluster, and can forward requests directly to the correct node. The transport client can be used to send requests to a remote cluster. It doesn't join the cluster itself, but simply forwards requests to a node in the cluster. Other APIs, such as the RESTful API, can be used. Various languages (e.g., Groovy, JavaScript, .NET, PHP, Perl, Python, Ruby, and the like) can be used to communicate with a cluster using the RESTful API In some embodiments, nodes (e.g., one or more nodes $120_1$-$120_X$) can communicate using an application protocol (e.g., Hypertext Transfer Protocol (HTTP), transport layer protocol (e.g., Transmission Control Protocol (TCP)), and the like. Nodes can know about all the other nodes in the cluster (e.g., cluster 130A) and can forward client (e.g., client 110) requests to the appropriate node. Each node can serve one or more purposes, master node and data node.

A master node can perform such cluster-wide actions as creating and/or deleting an index, tracking which nodes (e.g., one or more nodes $120_1$-$120_X$) are part of the cluster (e.g., cluster 130A), and deciding which shards to allocate to which nodes. Data nodes can hold shards that contain documents that have been indexed. Data nodes can handle data related operations such as create, read, update, and delete (operations that are used to administer persistent data storage; also referred to as CRUD), search, and aggregations. Ingest nodes can apply an ingest pipeline (e.g., a definition of a series of processors) to a document in order to transform and enrich the document before indexing. A tribe node can connect to multiple clusters and perform search and other operations across all connected clusters.

Each of client application 110A and one or more nodes $120_1$-$120_X$ can be a physical computing system, virtual machine, container, and the like. Generally, client application 110A can run on the same or different physical computing system, virtual machine, container, and the like as each of one or more nodes $120_1$-$120_X$. Each of one or more nodes $120_1$-$120_X$ can run on the same or different physical computing system, virtual machine, container, and the like as the others of one or more nodes $120_1$-$120_X$. A physical computing system is described further in relation to the exemplary computer system 800 of FIG. 8.

In some embodiments, virtual machines provide a substitute for a physical computing system and the functionality needed to execute entire operating systems. Virtual machines are created and run by a hypervisor which uses native execution to share and manage hardware, allowing for multiple environments which are isolated from one another, yet can exist on the same physical computing system.

In various embodiments, containers are an operating system-level virtualization method for deploying and running distributed applications without launching an entire virtual machine for each application. Containers can look like real computers from the point of view of programs running in them. Generally, a computer program running on an operating system can see all resources (e.g., connected devices, files and folders, network shares, CPU power, etc.) of that computer. However, programs running inside a container can only see the container's contents and devices assigned to the container. Containers can be arranged, coordinated, and managed by container orchestration (e.g., Kubernetes, Amazon Elastic Container Service, Docker Swarm, and the like). In contrast to hypervisor-based virtualization, containers may be an abstraction performed at the operating system (OS) level, whereas virtual machines are an abstraction of physical hardware.

When client application 110A runs on a different physical server from a node (e.g., of one or more nodes $120_1$-$120_X$), connections 140 can be a data communications network (e.g., various combinations and permutations of wired and wireless networks such as the Internet, local area networks (LAN), metropolitan area networks (MAN), wide area networks (WAN), and the like using Ethernet, Wi-Fi, cellular networks, and the like). When a node (of one or more nodes $120_1$-$120_X$) runs on a different physical computing system from another node (of one or more nodes $120_1$-$120_X$), connections 140 can be a data communications network.

Figure 2:
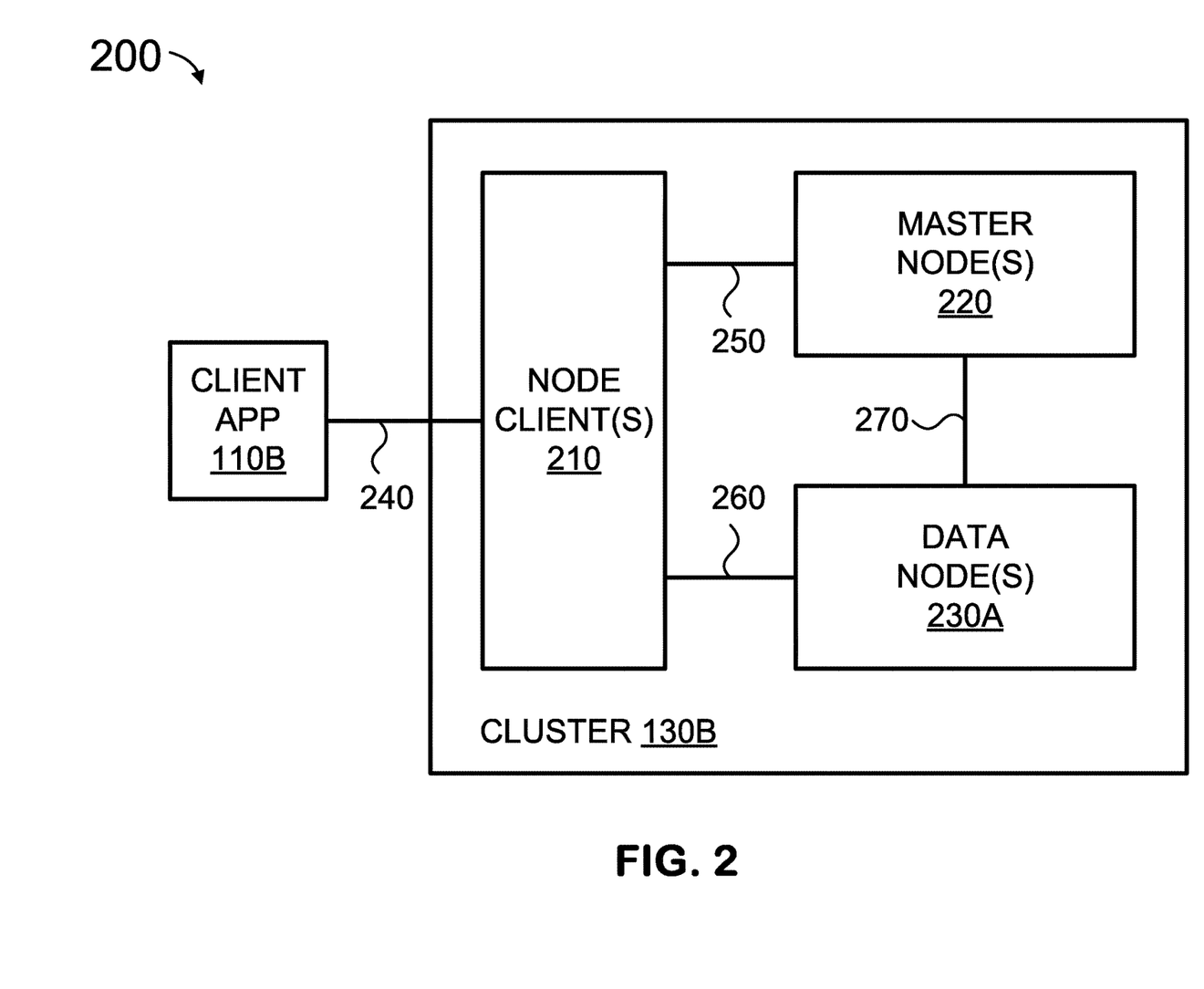
FIG. 2 is a simplified block diagram with a detailed view of a cluster, according to various embodiments.

FIG. 2 shows system 200 having a distributed application structure, according to some embodiments. System 200 can include client application 110B and cluster 130B. Client application 110E and cluster 130B can each have at least some of the characteristics described above in relation to client application 110A and cluster 130A (including one or more nodes $120_1$-$120_X$) in FIG. 1, respectively. Cluster 130B can include node client(s) 210, master node(s) 220, and data node(s) 230A. Node clients, master nodes, and data nodes were described above in relation to FIG. 1.

According to various embodiments, connections 240-270 can each include the same or different data communications network (e.g., various combinations and permutations of wired and wireless networks such as the Internet, local area networks (LAN), metropolitan area networks (MAN), wide area networks (WAN), and the like using Ethernet, Wi-Fi, cellular networks, and the like). For example, client application 110B can send an indexing and/or search request to node client(s) 210, and receive an indexing and/or search response from node client(s) 210 via connections 240. By way of further non-limiting example, node client(s) 210 can coordinate cluster state and metadata with master node(s) 220 via connections 250. By way of additional non-limiting example, node client(s) 210 can forward indexing and/or search requests to data node(s) 230A, and receive an indexing and/or search response from data node(s) 230A via connections 260. By way of further non-limiting example, master node(s) 220 can coordinate cluster state and metadata with data node(s) 230A via connections 270.

Figure 3:
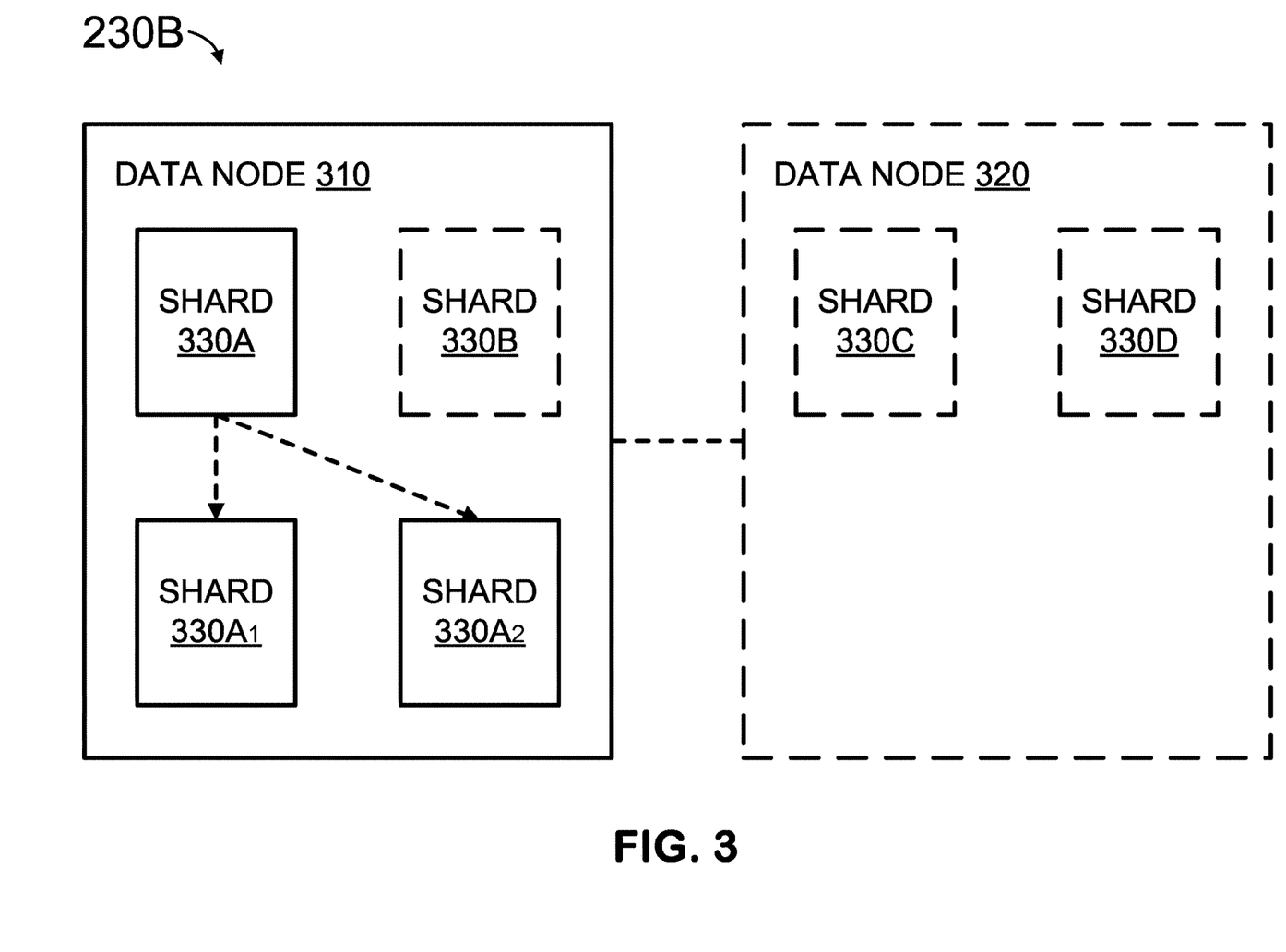
FIG. 3 is a simplified block diagram with a detailed view of data nodes, in accordance with some embodiments.

FIG. 3 illustrates data node(s) 230B according to some embodiments. By way of non-limiting example, data node(s) 230B can include data node 310 and data node 320. Data node(s) 230B can comprise more or fewer data nodes. Data node(s) 230B (and data node 310 and data node 320) can have at least some of the characteristics of one or more nodes $120_1$-$120_X$ (FIG. 1) and data node(s) 230A (FIG. 2).

According to some embodiments, the distributed application is a distributed, multitenant-capable full-text search engine, such as Elasticsearch. Elasticsearch is a document-oriented database designed to store, retrieve, and manage document-oriented or semi-structured data. As described above, an index is a collection of documents that can have somewhat similar characteristics and a document is a basic unit of information that can be indexed. An index can potentially store a large amount of data that can exceed the hardware limits of a single node (e.g., data node(s) 230B, data node(s) 230A (FIG. 2), and one or more nodes $120_1$-$120_X$ (FIG. 1)). An index can be subdivided into multiple pieces called shards. When an index is created, the number of shards can be specified. Each shard can in itself be a fully-functional and independent "index" that can be hosted on any node (e.g., data node(s) 230B, data node(s) 230A (FIG. 2), and one or more nodes $120_1$-$120_X$ (FIG. 1)) in the cluster (e.g., cluster 130A (FIG. 1) and cluster 130B).

A shard itself may become too large, such that it consumes a large portion of disk space, takes a long time to search, and the like. Ideally, such a shard would be subdivided into two (or more) new shards, but subdividing an existing shard is a fragile and time-consuming process, and instead the index was re-created with a larger number of shards. Reindexing creates a new index with new settings (e.g., more shards) and copies all of the documents from the existing index to the new index. Unfortunately, reindexing can take hours (possibly days) to complete, depending on the number and size of the documents. Moreover, reindexing is fragile, because corruption can occur when changes are made to the index by the application while reindexing is also taking place.

Previously, subdividing an existing shard also posed technical challenges, rendering it impractical. For example, subdividing a shard is almost equivalent to reindexing all the data. In addition, subdividing a shard may require that the cluster have enough capacity to hold a second complete copy of the index.

Various embodiments split a shard into new shards in a quick and fault tolerant manner. Although as shown in FIG. 3 data node 310 and data node 320 each have two shards (shards 330A-330D), various combinations and permutations in the number of data nodes and respective number of shards can be used. Each of shards 330A-330D can be split into two or more new shards. The number of target shards is a factor of the number of source shards. For example, one shard can be split into six new shards, and then the six new shards can be split into twelve newer shards. By way of further example, one shard can be split into five new shards, but the five new shards cannot be split into seven newer shards.

In various embodiments, since a shard is a part of an index, splitting a source shard (into target shards) involves creating a new index (called a target index) from the source index, where the target index has more shards than the source index. Generally a source shard (e.g., shard 330A) is in the same data node (e.g., data node 310) as the target shards (e.g., shard $330A_1$ and shard $330A_2$). Once a shard is successfully split, one or more of the resulting target shards can be moved to different data nodes (e.g., data node 320).

For the purposes of illustration and not limitation, splitting shard 330A into two shards, shard $330A_1$ and shard $330A_2$, is described. Other shard splitting ratios can be used, such as 1:5, 2:6, 3:12, 4:20, and the like. By way of non-limiting example, the techniques described for a 1:2 split can be applied (separately) to two shards to perform a 2:4 split and/or adjusted to perform a 1:7 split. The number of target shards is a factor of the number of source shards. For example, when there are two (source) shards (e.g., shards 330A-330B) in a 2:4 split, then (source) shard 330A can have the documents for (target) shards $330A_1$ and $330A_2$, and (source) shard 330B can have the documents for (target) shards $330B_1$ and $330B_2$ (not depicted in FIG. 3). By way of further example, when there are three (source) shards (e.g., shards 330A-330C) in a 3:6 split, then (source) shard 330A can have the documents for (target) shards $330A_1$ and $330A_2$, (source) shard 330B can have the documents for (target) shards $330B_1$ and $330B_2$ (not depicted in FIG. 3), and (source) shard 330C can have the documents for (target) shards $330C_1$ and $330C_2$ (not depicted in FIG. 3).

Figure 4:
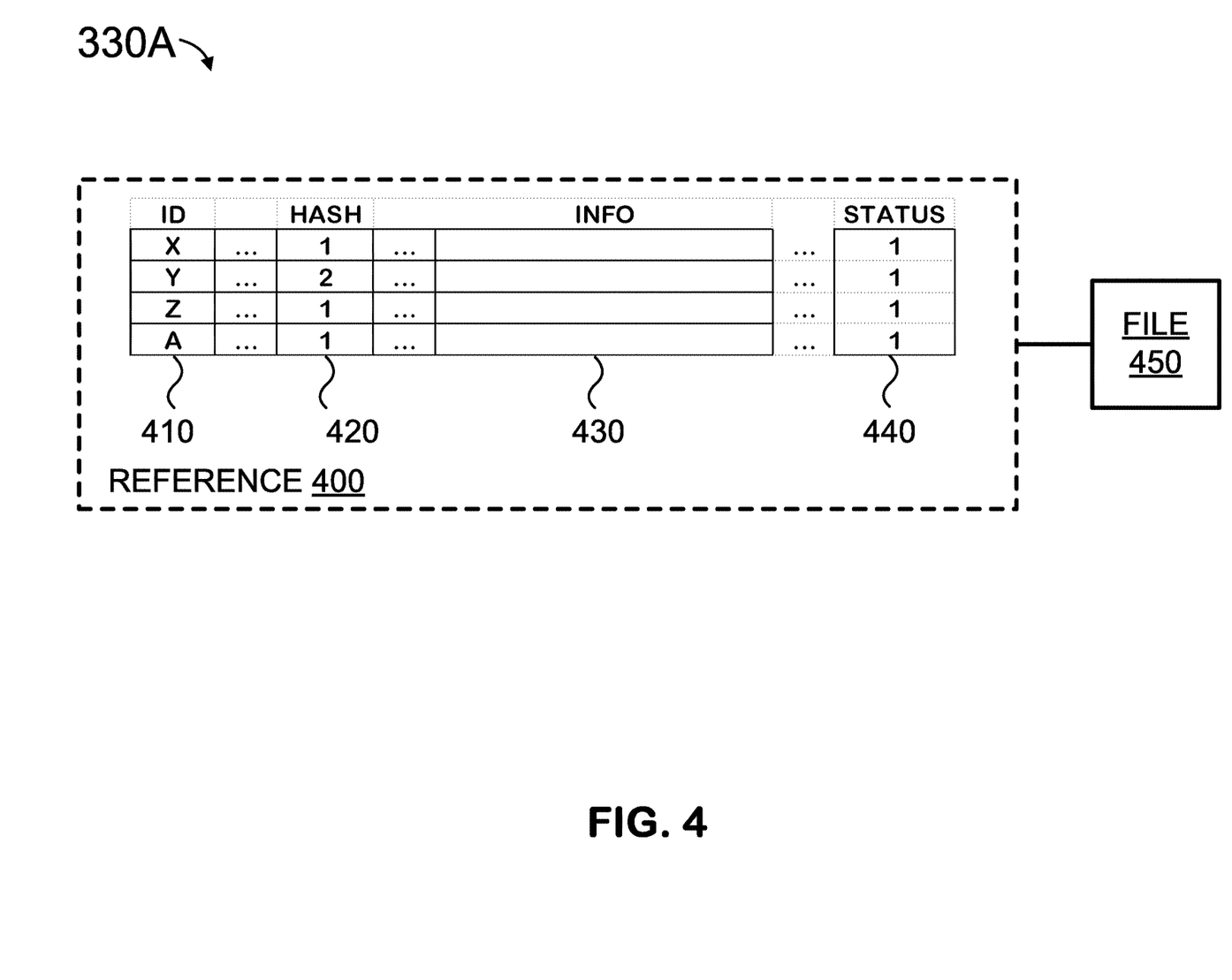
FIG. 4 depicts a source shard, in accordance with various embodiments.

FIG. 4 depicts shard 330A, according to some embodiments. Each shard can include documents and a reference (e.g., reference 400) to the documents. The documents (e.g., associated with ID 410 of X, Y, Z, and A) in a shard (e.g., shard 330A) can be stored in file 450. File 450 can also be called data, payload, and file content. File 450 can be on the data node (e.g., data node 310 in FIG. 3) hosting the shard (e.g., shard 330A in FIG. 3).

According to various embodiments, reference 400 can be a Lucene index. Lucene is an information retrieval software library and a Lucene index includes one or more documents. For the purposes of illustration and not limitation, reference 400 is shown for one segment (reference 400 can have more than one segment). A segment can be an inverted index. An inverted index is a data structure used to make data searchable. An inverted index stores a mapping from content, such as words or numbers, to its locations in a document or a set of documents. An inverted index enables fast full text searches, at a cost of increased processing when a document is indexed (e.g., the document is stored such that it can be retrieved and queried). A search in a shard will search each segment in the shard and then combine their results into the final results for the shard. As each document is indexed, a segment is created or updated (e.g., the search is refreshed to include the document) and written to disk. A segment can include one or more documents. Segments are immutable, so when a document is updated, the old document is marked as deleted, and a new document is indexed.

Reference 400 includes columns which pertain to a document in the segment, such as ID 410, hash 420, information 430, status 440. Each row is a document in the segment. ID 410 can be an identifier that uniquely identifies each document in the segment (e.g., X, Y, Z, and A). Hash 420 can result from a consistent hash of ID 410, where the consistent hash can be performed during shard splitting. Hash 420 determines into which of the new shards (e.g., shard $330A_1$ and shard $330A_2$) a particular document will be stored in after shard splitting. Consistent hashing is a special kind of hashing such that when a hash table is resized, only K/n keys need to be remapped on average, where K is the number of keys, and n is the number of slots. Other hashing methods can be used.

Information 430 can be (the data in or concerning) the particular document (e.g., associated with ID 410 of X, Y, Z, and A). By way of non-limiting example, information 430 can be body, title, author, date, abstract, body, keywords, metadata, page rank, link (e.g., Uniform Resource Locator (URL)), and the like. Although one column is depicted for information 430 in FIG. 4, there can multiple columns, such as a column for each type of information 430 in reference 400.

Status 440 can denote whether the document is alive or deleted. Here, a "1" can denote the document is alive and a "0" can denote the file is deleted. In an alternative "tombstone" scheme, a "1" can denote the document is deleted and a "0" can denote the document is alive. In some embodiments, status 440 (along with a copy of ID 410) can be in a different file from the information in the other columns (e.g., ID 410, hash 420, and information 430).

Figure 5:
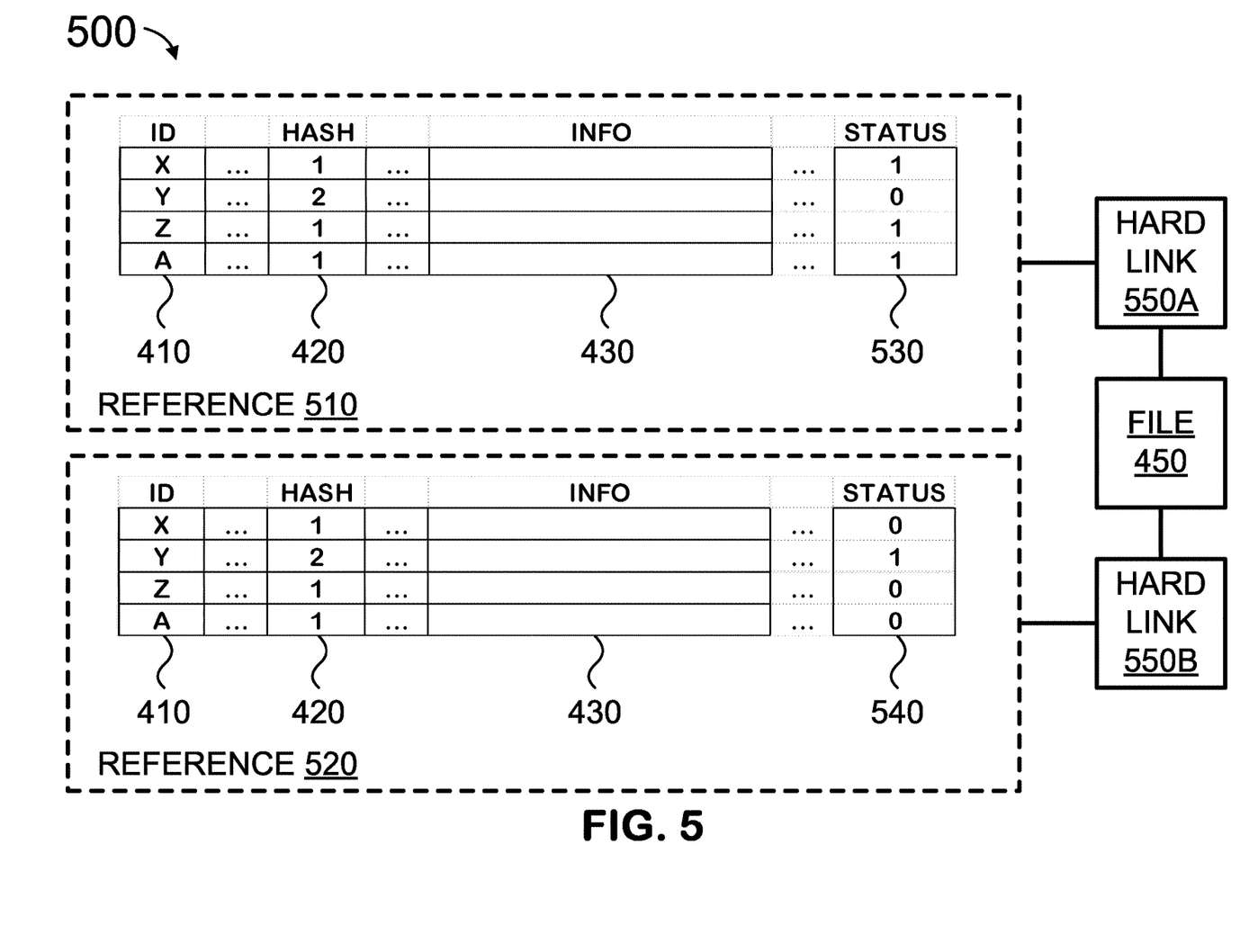
FIG. 5 shows target references of a split shard, according to some embodiments.

FIG. 5 depicts references 500 after shard splitting (e.g., splitting shard 330A into shard 330A$_1$ and shard 330A$_2$ (FIG. 3)). By way of non-limiting example, reference 510 is for shard 330A$_1$ and reference 520 is for shard 330A$_2$ (FIG. 3). During shard splitting, hash 420 can be produced for reference 400 (FIG. 4). Also during shard splitting, two physical copies (e.g., reference 510 and reference 520 called target references) of the source reference (e.g., reference 400 in FIG. 4) of the shard to be split (e.g., shard 330A in FIG. 3) can be made, except status 440 (which can be in a separate file) is omitted.

Documents associated with ID 410 of X, Y, Z, and A can be stored in file 450. File 450 can be stored in the data node (e.g., data node 310 in FIG. 3) hosting the shard (e.g., shard 330A in FIG. 3). Instead of making copies of file 450 (and hence the documents) and having references 510 and 520 refer to two different copies of file 450, references 510 and 520 use hard links 550A and 550B (respectively) to refer to (the same) file 450.

Hard links 550A and 550B can use a file system facility called a hard link. A hard link is a locator/reference to a physical file on disk. For example, a hard link is a directory entry that associates a name with a file on a file system. Directory-based file systems can have at least one hard link giving the original name for each file. The hard link allows the same file (e.g., file 450) to be referenced from two different places (e.g., references 510 and 520). According to various embodiments, hard link 550A hard links each of the files from a directory (not shown in FIG. 5) of reference 510 into a directory (not shown in FIG. 4) of reference 400. Similarly, hard link 550B hard links each of the files from a directory (not shown in FIG. 5) of reference 520 into a directory (not shown in FIG. 4) of reference 400.

The physical copies can be made in on the order of milliseconds. During shard splitting, new columns status 530 and status 540 are produced for reference 510 and reference 520, respectively, using hash 420 (e.g., from reference 400, or reference 510 and reference 520). For example, hash 420 denotes that after shard splitting document X will go to shard 330A$_1$, so status 530 denotes document X is alive and status 540 denotes document X is deleted. By way of further example, hash 420 denotes that after shard splitting document Y will go to shard 330A$_2$, so status 530 denotes document Y is deleted and status 540 denotes document Y is alive. By way of additional example, hash 420 denotes that after shard splitting documents Z and A will go to shard 330A$_1$, so status 530 denotes documents Z and A are alive and status 540 denotes documents Z and A are deleted. In this way, all documents that don't belong in a new/target shard are marked as deleted.

As explained above, reference 510 and reference 520 do not contain complete copies of the documents (e.g., associated with ID 410 of X, Y, Z, and A)—instead they have hard links 550A and 550B to file 450 (which contains the documents)—so they advantageously consume minimal or negligible disk space. Since reference 510 and reference 520 are copies of reference 400 (except for status 440 for which they have their own versions, status 530 and status 540), they have the same characteristics as reference 400.

Figure 6:
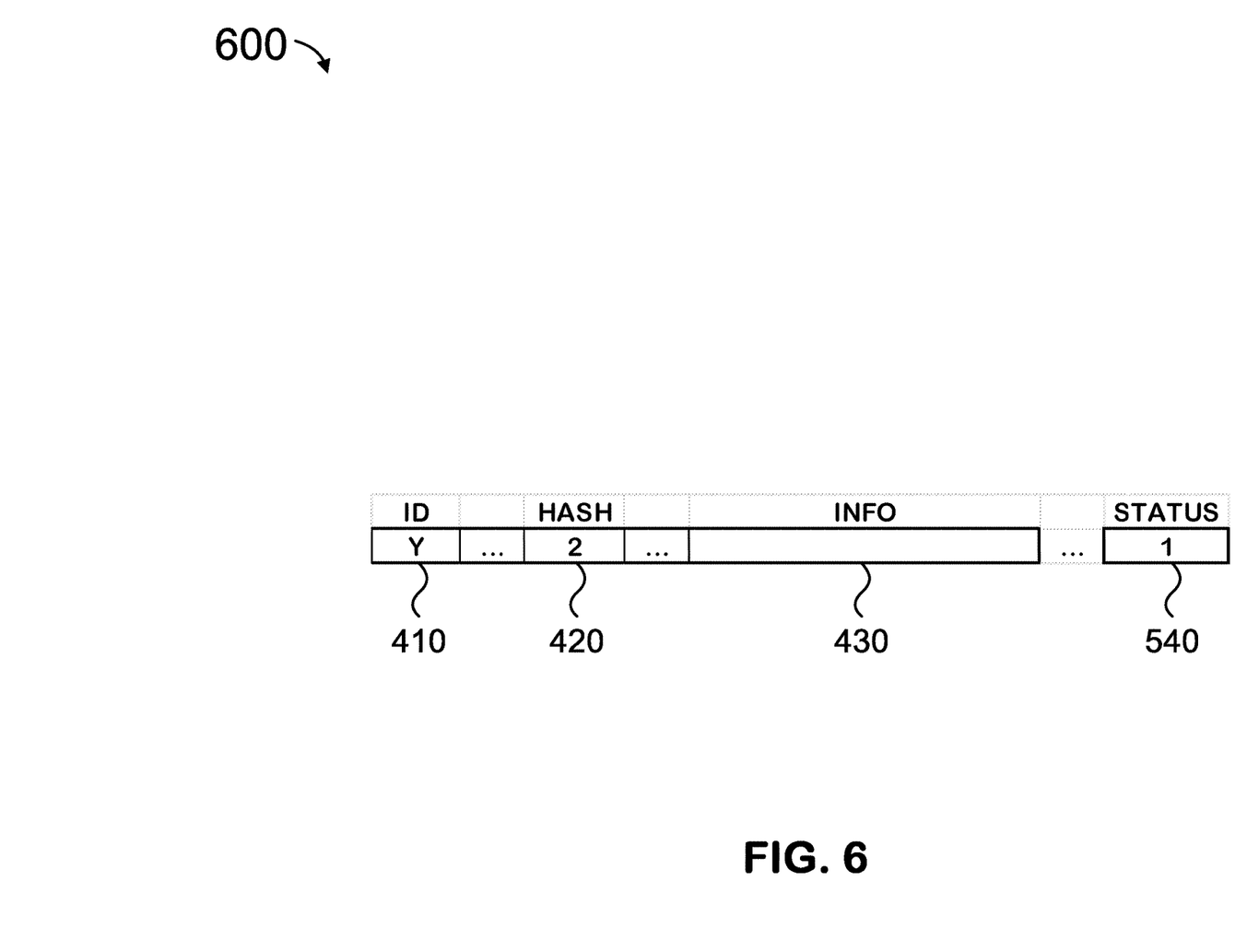
FIG. 6 illustrates a target reference after a force merge operation, according to various embodiments.

FIG. 6 illustrates reference 520 (FIG. 5) after an optional forced merge, producing reference 600. In a forced merge, documents marked for deletion in a segment are removed from the reference. In various embodiments, the physical file associated with the document can be removed from the disk. A forced merge can be optionally performed for each of the new shards (e.g., reference 510 (FIG. 5) for shard 330A$_1$ (FIG. 3) and reference 520 (FIG. 5) for shard 330A$_2$ (FIG. 3).

Figure 7:
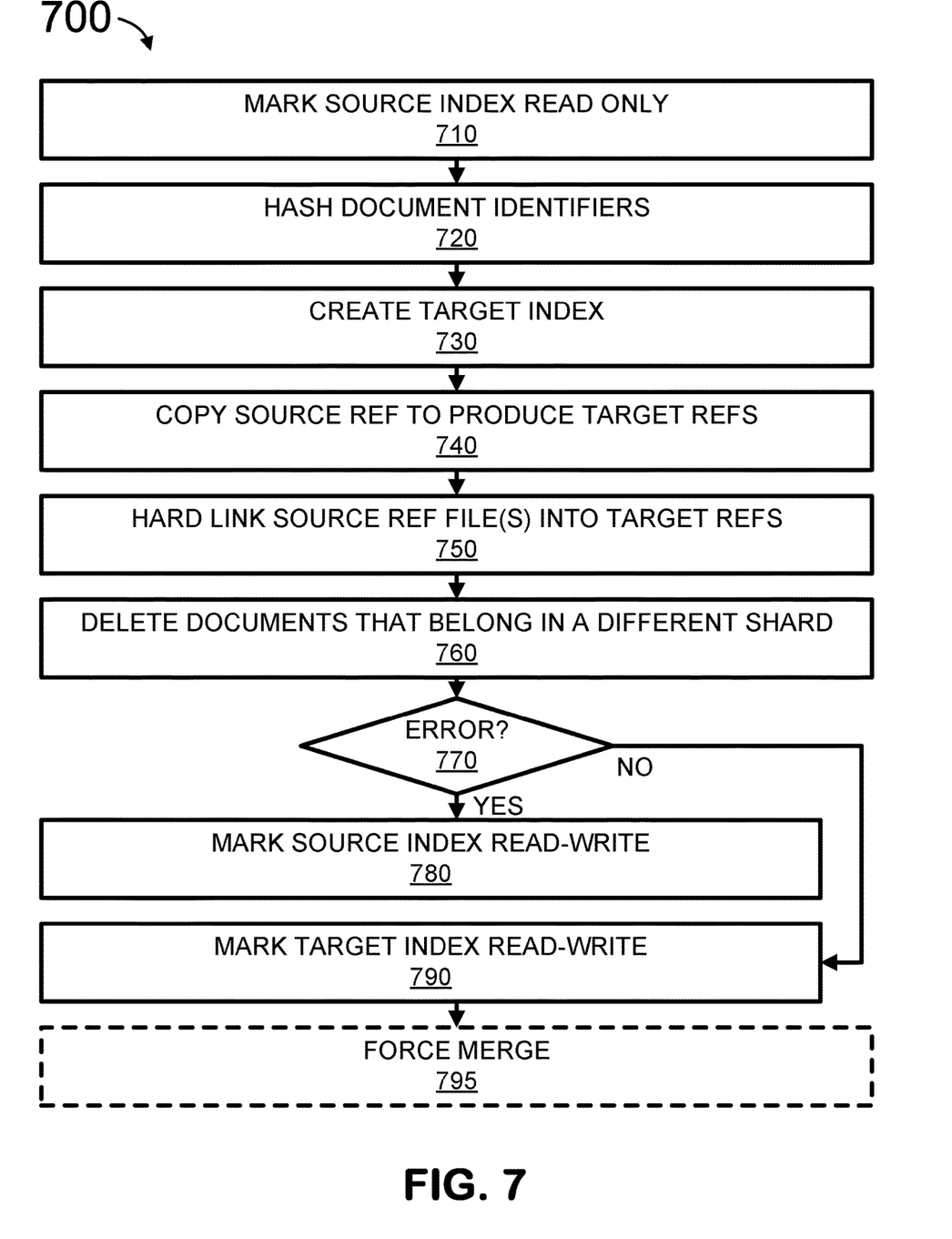
FIG. 7 is a simplified flow diagram of a method for splitting a shard, in accordance with some embodiments.

FIG. 7 depicts method 700 for shard splitting in accordance with some embodiments. In various embodiments, method 700 can be performed by cluster 130A (FIG. 1), cluster 130B (FIG. 2), and the like. Method 700 can commence at step 710, where a source index is marked read only, so changes are not made to the source index. In some embodiments, the source index is an Elasticsearch index. Also at step 710, a number of target shards can be received (e.g., from a user, system administrator, and the like). According to various embodiments, the number of target shards is a factor of the number of source shards. At step 720, identifiers in a reference of a source shard (of the source index) are hashed. For example, identifiers uniquely identify documents in the source shard and the identifiers are hashed using consistent hashing to determine into which target shard they will be placed.

At step 730, a target index is created with the same definition as the source index, but with a larger number (e.g., a target number) of shards. The number of target shards is a factor of the number of source shards. At step 740, since shards are parts of an index, a source reference associated with a source shard is copied. For example, (source) reference 400 (FIG. 4) is copied to produce (target) references 510 and 520 (FIG. 5). Generally, the copying uses a file copying facility of a file system. File copying is the creation of a new file which has the same content as an existing file. Any number of copies of the reference can be made, depending on the number of target shards. For example, in a 1:2 shard split two copies are made, 1:3 shard split three copies are made, etc.

At step 750, file(s) (e.g., file 450 in FIG. 5) in the source reference are hard linked (e.g., hard links 550A and 550B) into the target references. For example, hard link 550A hard links each of the files from a directory (not shown in FIG. 5) of (target) reference 510 into a directory (not shown in FIG. 4) of (source) reference 400. By way of further example, hard link 550B hard links each of the files from a directory (not shown in FIG. 5) of (target) reference 520 into a directory (not shown in FIG. 4) of (source) reference 400.

At step 760, documents that belong in a different target shard can be deleted from each target shard. Since segments are immutable, documents are denoted as being alive or deleted. For example, new columns status 530 and status 540 are produced for reference 510 and reference 520 (FIG. 5), respectively, using hash 420 (e.g., from reference 400 (FIG. 4), or reference 510 and reference 520). For example, hash 420 denotes that after shard splitting document X will go to shard 330A$_1$, so status 530 denotes document X is alive and status 540 denotes document X is deleted. By way of further example, hash 420 denotes that after shard splitting document X will go to shard 330A$_2$, so status 530 denotes document X is deleted and status 540 denotes document X is alive.

At step 770, whether an error and/or exception has occurred is determined. An error or exception can be reported by the file system and/or the application. For example, an error or exception can be a read error, write error, cannot open file error, checksum failure, copy failure, and the like. When an error and/or exception has occurred, method 700 proceeds to step 780. When an error and/or exception has not occurred, method 700 proceeds to step 790.

At step 780, the source index can be marked read-write (e.g., so the source index can be written to (changed)) and the application operates as if shard splitting did not occur. Optionally at step 780, the target index and target references can be deleted. Optionally at step 780, a message indicating that the shard splitting failed can be reported and/or logged.

At step 790, the target index can be marked read-write as if it were the source index (earlier marked read only) that had been marked read-write. In this way, the target index with a new number of shards (e.g., the target number of shards) is used instead of the source index. Optionally at step 790, the source index can be deleted. Optionally at step 790, a message indicating that the shard splitting succeeded can be reported and/or logged.

Optionally at step 795, a forced merge operation can be performed on the (new) target references to remove documents marked as deleted. At least some of the steps of method 700 can be performed concurrently and/or in different sequences than illustrated in FIG. 7.

Typically, steps 710-780 can be performed very quickly (e.g., in less than a minute), depending on the number of shards, indexed documents, etc. As described above and in the several drawings, embodiments of the present technology improve upon the operation of computer systems by providing a quick and fault tolerant solution to the problem of shard splitting, which includes a small data structure for the target references.

Figure 8:
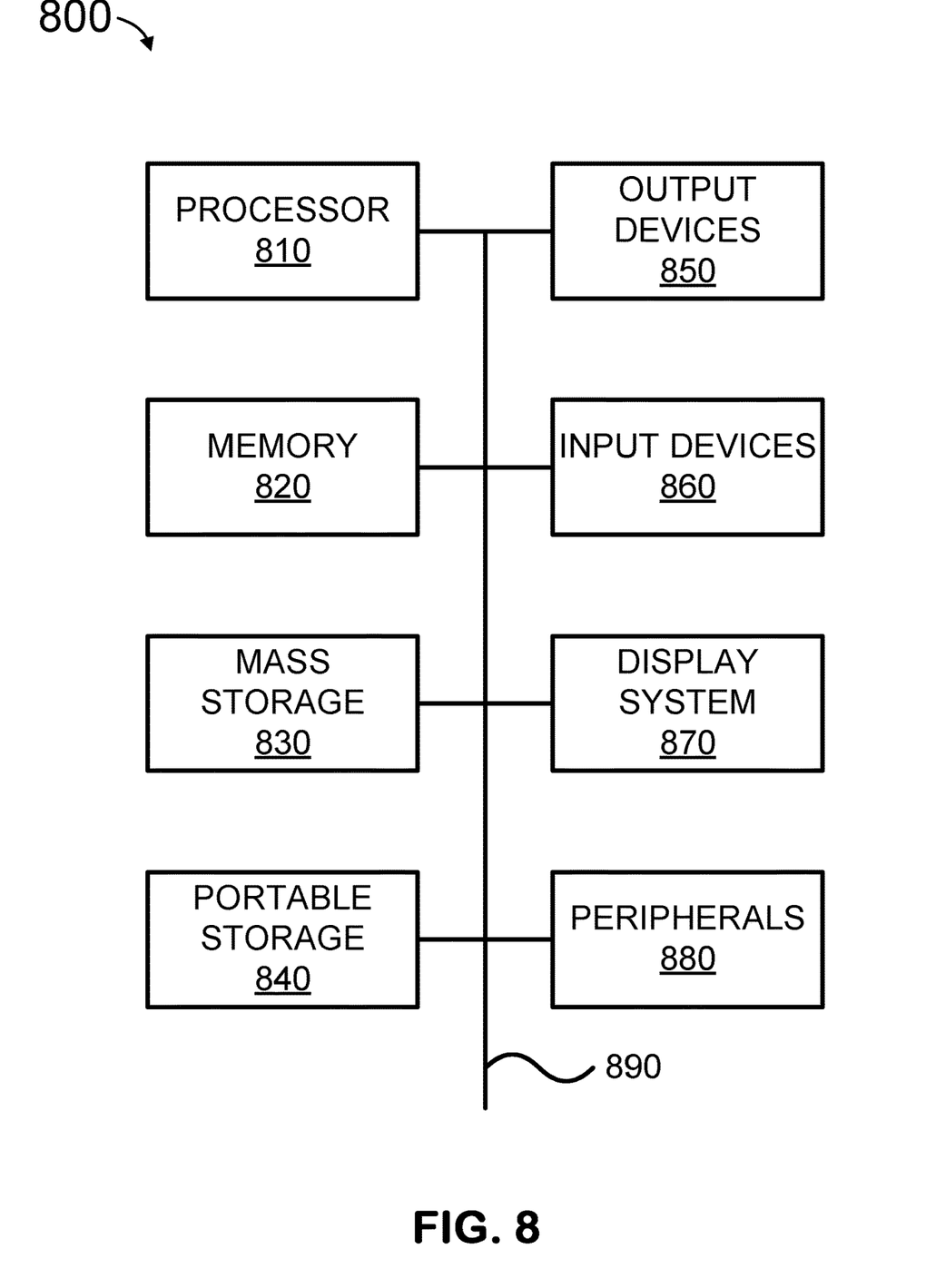
FIG. 8 is a simplified block diagram of a computing system, in accordance with various embodiments.

FIG. 8 illustrates an exemplary computer system 800 that may be used to implement some embodiments of the present invention. The computer system 800 in FIG. 8 may be implemented in the contexts of the likes of computing systems, networks, servers, or combinations thereof. The computer system 800 in FIG. 8 includes one or more processor unit(s) 810 and main memory 820. Main memory 820 stores, in part, instructions and data for execution by processor unit(s) 810. Main memory 820 stores the executable code when in operation, in this example. The computer system 800 in FIG. 8 further includes a mass data storage 830, portable storage device 840, output devices 850, user input devices 860, a graphics display system 870, and peripheral device(s) 880.

The components shown in FIG. 8 are depicted as being connected via a single bus 890. The components may be connected through one or more data transport means. Processor unit(s) 810 and main memory 820 are connected via a local microprocessor bus, and the mass data storage 830, peripheral device(s) 880, portable storage device 840, and graphics display system 870 are connected via one or more input/output (I/O) buses.

Mass data storage 830, which can be implemented with a magnetic disk drive, solid state drive, or an optical disk drive, is a non-volatile storage device for storing data and instructions for use by processor unit(s) 810. Mass data storage 830 stores the system software for implementing embodiments of the present disclosure for purposes of loading that software into main memory 820.

Portable storage device 840 operates in conjunction with a portable non-volatile storage medium, such as a flash drive, floppy disk, compact disk, digital video disc, or Universal Serial Bus (USB) storage device, to input and output data and code to and from the computer system 800 in FIG. 8. The system software for implementing embodiments of the present disclosure is stored on such a portable medium and input to the computer system 800 via the portable storage device 840.

User input devices 860 can provide a portion of a user interface. User input devices 860 may include one or more microphones, an alphanumeric keypad, such as a keyboard, for inputting alphanumeric and other information, or a pointing device, such as a mouse, a trackball, stylus, or cursor direction keys. User input devices 860 can also include a touchscreen. Additionally, the computer system 800 as shown in FIG. 8 includes output devices 850. Suitable output devices 850 include speakers, printers, network interfaces, and monitors.

Graphics display system 870 include a liquid crystal display (LCD) or other suitable display device. Graphics display system 870 is configurable to receive textual and graphical information and processes the information for output to the display device.

Peripheral device(s) 880 may include any type of computer support device to add additional functionality to the computer system.

Some of the components provided in the computer system 800 in FIG. 8 can be those typically found in computer systems that may be suitable for use with embodiments of the present disclosure and are intended to represent a broad category of such computer components. Thus, the computer system 800 in FIG. 8 can be a personal computer (PC), hand held computer system, telephone, mobile computer system, workstation, tablet, phablet, mobile phone, server, minicomputer, mainframe computer, wearable, or any other computer system. The computer may also include different bus configurations, networked platforms, multi-processor platforms, and the like. Various operating systems may be used including UNIX, LINUX, WINDOWS, MAC OS, PALM OS, QNX ANDROID, IOS, CHROME, and other suitable operating systems.

Some of the above-described functions may be composed of instructions that are stored on storage media (e.g., computer-readable medium). The instructions may be retrieved and executed by the processor. Some examples of storage media are memory devices, tapes, disks, and the like. The instructions are operational when executed by the processor to direct the processor to operate in accord with the technology. Those skilled in the art are familiar with instructions, processor(s), and storage media.

In some embodiments, the computing system 800 may be implemented as a cloud-based computing environment, such as a virtual machine operating within a computing cloud. In other embodiments, the computing system 800 may itself include a cloud-based computing environment, where the functionalities of the computing system 800 are executed in a distributed fashion. Thus, the computing system 800, when configured as a computing cloud, may include pluralities of computing devices in various forms, as will be described in greater detail below.

In general, a cloud-based computing environment is a resource that typically combines the computational power of a large grouping of processors (such as within web servers) and/or that combines the storage capacity of a large grouping of computer memories or storage devices. Systems that provide cloud-based resources may be utilized exclusively by their owners or such systems may be accessible to outside users who deploy applications within the computing infrastructure to obtain the benefit of large computational or storage resources.

The cloud is formed, for example, by a network of web servers that comprise a plurality of computing devices, such as the computing system 800, with each server (or at least a plurality thereof) providing processor and/or storage resources. These servers manage workloads provided by multiple users (e.g., cloud resource customers or other users). Typically, each user places workload demands upon the cloud that vary in real-time, sometimes dramatically. The nature and extent of these variations typically depends on the type of business associated with the user.

It is noteworthy that any hardware platform suitable for performing the processing described herein is suitable for use with the technology. The terms "computer-readable storage medium" and "computer-readable storage media" as used herein refer to any medium or media that participate in providing instructions to a CPU for execution. Such media can take many forms, including, but not limited to, non-volatile media, volatile media and transmission media. Non-volatile media include, for example, optical, magnetic, and solid-state disks, such as a fixed disk. Volatile media include dynamic memory, such as system random-access memory (RAM). Transmission media include coaxial cables, copper wire and fiber optics, among others, including the wires that comprise one embodiment of a bus. Transmission media can also take the form of acoustic or light waves, such as those generated during radio frequency (RF) and infrared (IR) data communications. Common forms of computer-readable media include, for example, a floppy disk, a flexible disk, a hard disk, magnetic tape, any other magnetic medium, a CD-ROM disk, digital video disk (DVD), any other optical medium, any other physical medium with patterns of marks or holes, a RAM, a programmable read-only memory (PROM), an erasable programmable read-only memory (EPROM), an electrically erasable programmable read-only memory (EEPROM), a Flash memory, any other memory chip or data exchange adapter, a carrier wave, or any other medium from which a computer can read.

Various forms of computer-readable media may be involved in carrying one or more sequences of one or more instructions to a CPU for execution. A bus carries the data to system RAM, from which a CPU retrieves and executes the instructions. The instructions received by system RAM can optionally be stored on a fixed disk either before or after execution by a CPU.

Computer program code for carrying out operations for aspects of the present technology may be written in any combination of one or more programming languages, including an object oriented programming language such as JAVA, SMALLTALK, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The corresponding structures, materials, acts, and equivalents of all means or step plus function elements in the claims below are intended to include any structure, material, or act for performing the function in combination with other claimed elements as specifically claimed. The description of the present technology has been presented for purposes of illustration and description, but is not intended to be exhaustive or limited to the invention in the form disclosed. Many modifications and variations will be apparent to those of ordinary skill in the art without departing from the scope and spirit of the invention. Exemplary embodiments were chosen and described in order to best explain the principles of the present technology and its practical application, and to enable others of ordinary skill in the art to understand the invention for various embodiments with various modifications as are suited to the particular use contemplated.

Aspects of the present technology are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present technology. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The description of the present technology has been presented for purposes of illustration and description, but is not intended to be exhaustive or limited to the invention in the form disclosed. Many modifications and variations will be apparent to those of ordinary skill in the art without depart-

What is claimed is:

1. A computer-implemented method for splitting a shard comprising:
    marking a source index as read only, the source index comprising a source shard, the source shard comprising a source reference;
    creating a target index, the target index comprising target shards, each target shard of the target shards comprising a target reference of target references;
    copying the source reference, the copying producing the target references;
    hashing identifiers in the source reference, each identifier being associated with a document of a plurality of documents of the source shard, the hashing assigning each document of the plurality of documents to a target shard of the target shards, the plurality of documents being stored in a file associated with the source reference;
    deleting at least some documents of the plurality of documents in the target references, the at least some documents belonging in a different target shard of the target shards;
    assigning, for each identifier in the target shard, a status value in a status column of the target index based on the associated document of the target shard being alive or deleted;
    hard linking the file into the target references, the hard linking comprising referencing the status column in the target index, wherein the hard linking enables the file to be selectively referenced from at least a first target reference and a second target reference of the target references;
    when no error is reported by at least one of a file system and an application:
        marking the target index as read-write, such that the target index is used in place of the source index; and
        deleting the source index; and
    when an error is reported by at least one of the file system and the application, marking the source index as read-write.

2. The computer-implemented method of claim 1, wherein the target index has a same definition as the source index and a greater number of shards than the source index.

3. The computer-implemented method of claim 1, wherein the deleting denotes in two or more target references that the at least some documents are deleted.

4. The computer-implemented method of claim 1, further comprising receiving a number of target shards, the number of target shards being a factor of a number of source shards.

5. The computer-implemented method of claim 1, wherein the hashing is a consistent hashing.

6. The computer-implemented method of claim 1, wherein the source index and the target index are each an Elasticsearch index.

7. The computer-implemented method of claim 1, wherein the source reference and two or more target references are each a Lucene index.

8. The computer-implemented method of claim 1, wherein the source shard and two or more target shards are all in a same data node.

9. The computer-implemented method of claim 8, further comprising moving at least one of the two or more target shards to a different data node.

10. A system for splitting a shard comprising:
    a processor; and
    a memory coupled to the processor, the memory storing instructions executable by the processor to:
        mark a source index as read only, the source index comprising a source shard, the source shard comprising a source reference;
        create a target index, the target index comprising target shards, each target shard of the target shards comprising a target reference of target references;
        copy the source reference, the copying producing the target references;
        hash identifiers in the source reference, each identifier being associated with a document of a plurality of documents of the source shard, the hashing assigning each document of the plurality of documents to a target shard of the target shards, the plurality of documents being stored in a file associated with the source reference;
        delete at least some documents of the plurality of documents in the target references, the at least some documents belonging in a different target shard of the target shards;
        assign, for each identifier in the target shard, a status value in a status column of the target index based on the associated document of the target shard being alive or deleted;
        hard link the file into the target references, the hard link process comprising referencing the status column in the target index, wherein the hard link enables the file to be selectively referenced from at least a first target reference and a second target reference of the target references;
        when no error is reported by at least one of a file system and an application:
            mark the target index as read-write, such that the target index is used in place of the source index; and
            delete the source index; and
        when an error is reported by at least one of the file system and the application, mark the source index as read-write.

11. The system of claim 10, wherein the target index has a same definition as the source index and a greater number of shards than the source index.

12. The system of claim 10, wherein the deleting denotes in two or more target references that the at least some documents are deleted.

13. The system of claim 10, wherein the instructions are further executable by the processor to receive a number of target shards, the number of target shards being a factor of a number of source shards.

14. The system of claim 10, wherein the hashing is a consistent hashing.

15. The system of claim 10, wherein the source index and the target index are each an Elasticsearch index.

16. The system of claim 10, wherein the source reference and two or more target references are each a Lucene index.

17. The system of claim 10, wherein
    the source shard and two or more target shards are all in a same data node, and
    the instructions are further executable by the processor to move at least one of the two or more target shards to a different data node.

18. A non-transitory computer-readable medium having embodied thereon a program, the program being executable by a processor to perform a method for splitting a shard, the method comprising:

marking a source index as read only, the source index comprising a source shard, the source shard comprising a source reference;

creating a target index, the target index comprising target shards, each target shard of the target shards comprising a target reference of target references;

copying the source reference, the copying producing the target references;

hashing identifiers in the source reference, each identifier being associated with a document of a plurality of documents of the source shard, the hashing assigning each document of the plurality of documents to a target shard of the target shards, the plurality of documents being stored in a file associated with the source reference;

deleting at least some documents of the plurality of documents in the target references, the at least some documents belonging in a different target shard of the target shards;

assigning, for each identifier in the target shard, a status value in a status column of the target index based on the associated document of the target shard being alive or deleted;

hard linking the file into the target references, the hard linking comprising referencing the status column in the target index, wherein the hard linking enables the file to be selectively referenced from at least a first target reference and a second target reference of the target references;

when no error is reported by at least one of a file system and an application:

marking the target index as read-write, such that the target index is used in place of the source index; and deleting the source index; and when an error is reported by at least one of the file system and the application, marking the source index as read-write.

* * * * *